INVENTOR.
Raymond P. Hawkinson
BY
Merchant & Merchant
ATTORNEYS

United States Patent Office 2,905,435
Patented Sept. 22, 1959

2,905,435

ATTACHMENT FOR TIRE SPREADERS

Raymond P. Hawkinson, Minneapolis, Minn., assignor to Paul E. Hawkinson Company, Minneapolis, Minn., a corporation of Minnesota Application February 28, 1956, Serial No. 568,245

3 Claims. (Cl. 254—50.3)

My invention relates to improvements in pneumatic tire spreaders and is in the nature of a modification of the structure disclosed and claimed in my co-pending application "Tire Spreader Construction," Serial No. 568,258, filed February 28, 1956.

The primary object of my invention is the provision of attachment means for tire spreaders of the type wherein the tire casings are held in an upright or vertical position during spreading operations, and which attachment means is designed to convert spreaders of this type having circumferentially spaced opposed pairs of relatively small tire bead engaging hook carrying heads to spreader heads of the type wherein the spreading force is exerted along a broad surface of the tire inner sidewalls immediately radially outwardly of the beads, and without any direct engagement of the spreader heads with the beads.

A further object of my invention is the provision of attachment means of the type immediately above described which is inexpensive to produce, is durable in construction, and is foolproof in its operation.

A still further object of my invention is the provision of attachment means of the type above described which is easy to attach and detach from a conventional tire spreader of the type in question and which is provided with means for locking same in securely operative position.

The above and still further objects of my invention will become apparent from the following detailed specification, appended claims, and attached drawings.

Referring to the drawings, wherein like characters indicate like parts throughout the several views.

Figure 1:
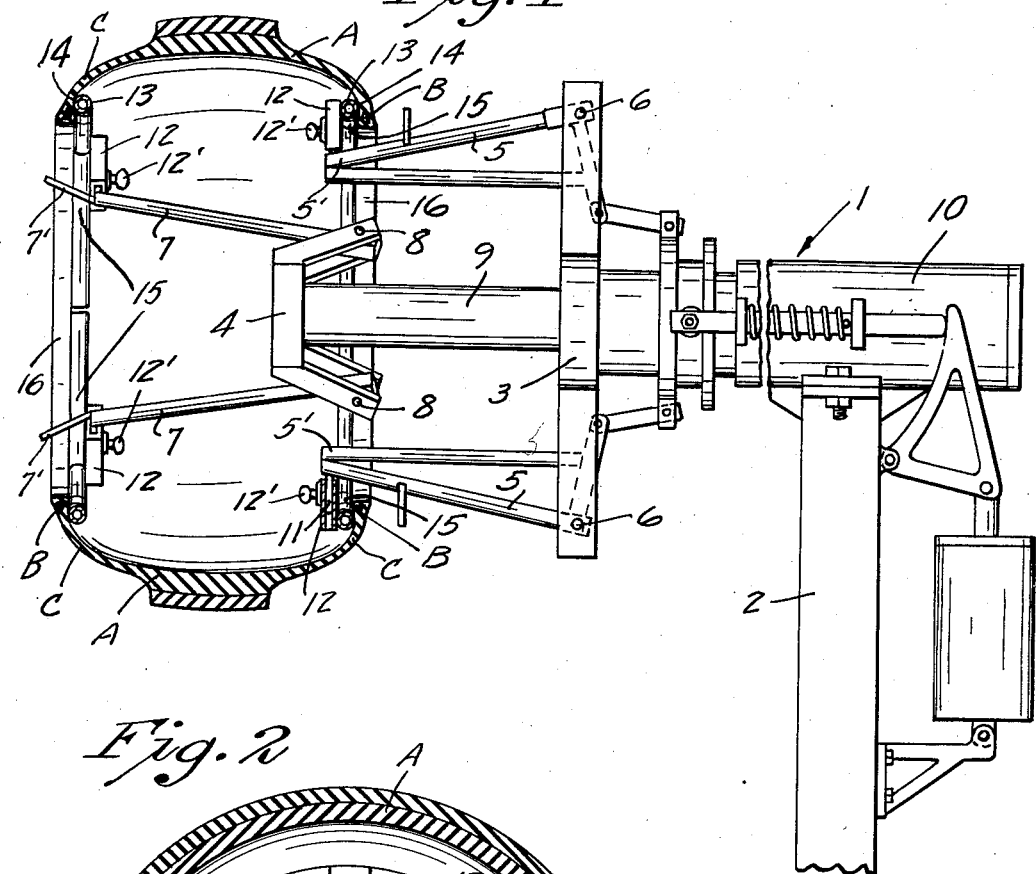
Fig. 1 is a view partly in side elevation and partly in vertical section showing a conventional tire spreader with my attachment means thereon in a tire spreading operation, some parts being broken away.

Referring with greater particularity to the drawings, the numeral 1 indicates in its entirety a conventional tire spreader of the type designed to hold the tire casing A in the vertical position shown in Fig. 1. Spreader 1 includes a supporting structure 2 and a pair of axially spaced concentric mounting members 3 and 4 mounted and guided on the supporting structure 2 for relative movements generally toward and away from one another along a common axis. Associated with the mounting member 3 is a plurality of circumferentially spaced spreader arms 5 which are each pivotally mounted as at 6 for swinging movements generally radially of the axis of said mounting member 3, and of a pneumatic tire casing A to be spread thereby. Associated with the cooperating mounting member 4 is a circumferentially spaced plurality of spreader arms 7 which are likewise pivotally secured as at 8 for swinging movements generally radially of said mounting member 4 and the tire casing A to be spread thereby, and which with the spreader arms 5 form cooperating pairs of spreader arms. The mounting member 4 is secured fast to the outer end of a plunger 9 projecting axially from a cylinder 10 on which the mounting member 4 is carried. The particular means for moving the mounting members 3, 4 toward and away from each other and imparting swinging movements to the spreader arms 5, 7 generally radially of the axis of the mounting member 3, 4 and of the tire A, form no part of the instant invention and hence will not be explained in detail. It suffices to state that this mechanism is adequately described in U.S. Patent No. 1,943,784 and particularly shown in Fig. 6 thereof.

Figure 2:
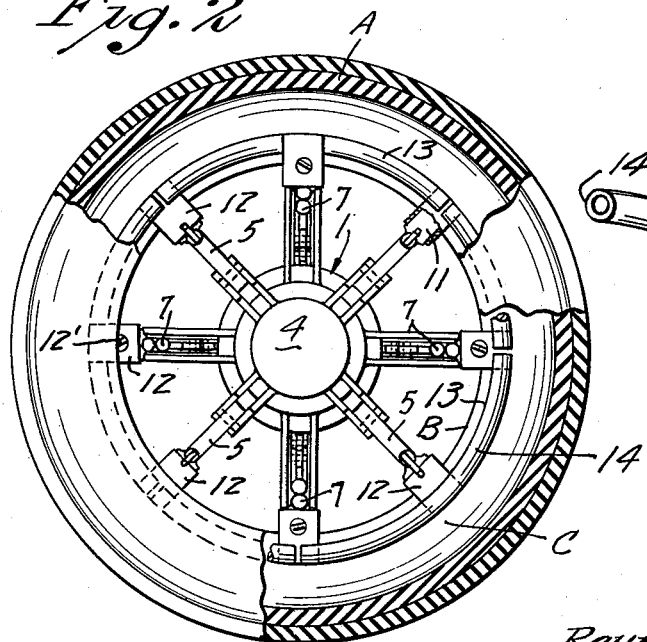
Fig. 2 is a view in front elevation some parts being broken away and some parts shown in section.
Figure 3:
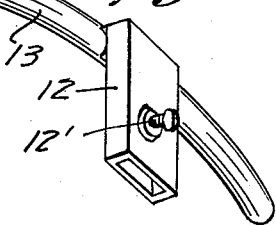
Fig. 3 is an enlarged perspective view of one of the supplemental arcuate shoe carrying spreader heads of my novel attachment means.

The spreader arms 5, 7 when moved toward the axis of the mounting members 3, 4 are sufficiently close together to permit insertion thereof through the central opening of the tire casing A defined by the bead portions B thereof. Spreader arms 5, 7 are provided adjacent the respective free end portions 5' and 7' with radially outwardly projecting substantially rectangular brackets 11. These rectangular bracket portions 11, as shown in Figs. 1 and 2 are of much greater width and radial extent than are the outturned hook ends designated at 20 in Figs. 5 and 6 of the Branick Patent 1,943,784 referred to above. As pointed out above and as shown in this patent these hook ends of the stretcher arms which have relatively short circumferential dimensions and are adapted to normally engage the bead portions B of the pneumatic tire casing A at circumferentially spaced points.

In order to avoid damage to the relatively inflexible portion of the fragile and air sealing bead portions B of a tubular tire casing A during spreading movements thereof by engagement therewith of any portion of the described spreading mechanism, I provide attachment means comprising socket-like supplemental heads 12 adapted to be snugly slideably received over each of said circumferentially spaced radial brackets 11 and for purposes of securing the socket-like supplemental heads 12 on the brackets 11 conventional wing nuts or the like 12' are provided. Rigidly secured to the radially outer end portions of the socket-like supplemental heads 12 and projecting generally equi-distantly laterally outwardly therefrom on opposite sides are arcuate tire sidewall engaging shoes 13, the sum total of the circumferential dimensions of which are only slightly less than 360 degrees when in the operative circle forming positions of Fig. 2. In no event should the individual shoes have circumferential dimensions of less than 60 degrees of circular arc.

It will be noted that the arcuate shoes 13 are preferably formed from tubular pipe sections bent into arcuate shape whereby to provide arcuate inner tire sidewall engaging surfaces 14. It also will be noted that the arcuate shoes 13 are sufficiently spaced from the outer end portions 5', 7' of the spreader arms 5, 7, that a recess 15 is provided therebetweeen for the reception of the relatively inflexible and damageable bead portions B of the tire casing A when the end portions 5', 7' are moved into initial supporting engagement with the axially extending circular inner rim engaging surfaces 16 of the bead portions B.

Referring again to Fig. 2, it will be noted that the arcuate shoes 13 when operatively positioned by initial supporting engagement of the free end portions 5', 7' of the arms 5, 7 with circumferentially spaced inner portions 16 of the relatively inflexible bead portions B are brought into engagement with the opposed inner sidewalls C of the tire casing A immediately radially outwardly of and definitely spaced from said beads B and generally concentric therewith. In other words, the free ends of the arms 5, 7 serve as stop means in this respect. With this arrangement, as the mounting members 3, 4 are moved away from each other, as above explained and as indicated in Fig. 1, the cross-sectionally arcuate inner tire sidewall engaging surface portions 14 of the arcuate shoes 13 are caused to rock and slide on the inner side walls and move somewhat closer to the beads B, thus pulling the beads B away from their initial supporting engagement with the outer end portions 5', 7' of the spreader arms 5, 7. Thus, the relatively inflexible and damageable beads B are allowed freedom of movement within the recesses 15 between the arcuate shoes 13 their carrying heads 12 and the end portions 5', 7' of the spreader arms 5, 7 during spreading movements. By this means not only are the beads B left undamaged, but also I have found that a tire casing A may be spread farther whereby to reduce its circumferential dimensions to an even greater extent, than is the case where said beads B are directly engaged by hook end portions of formerly constructed tire spreading machines.

My invention has been thoroughly tested and found to be completely satisfactory for the accomplishment of the above objects, and while I have disclosed a preferred embodiment thereof, it should be specifically understood that same is capable of considerable modification without departure from the scope and spirit of the appended claims.

What I claim is:

1. In a spreader device for tire casings having a pair of axially spaced mounting members supported for relative movement therebetween longitudinally along a common axis, a plurality of circumferentially spaced spreader arms extending generally axially of and pivotally mounted to each of said mounting members with the free end portions thereof generally radially movable relative to said common axis, the improvement comprising, in combination with the free end portions of said spreader arms, of an attachment means for engaging a tire casing sidewall, said attachment means including a laterally offset head carried by each of the free end portions, each of said heads having an axially offset circumferentially arcuate elongated tire casing sidewall engaging shoe disposed in radially outwardly spaced relation to the free end portion of the respective spreader arm, the free end portion of each spreader arm defining a stop means for initially engaging and supporting a tire bead to limit the radially outwardly pivotal movement thereof to position the respective head within the tire casing beyond the beads thereof and force its shoe into engagement with the tire casing inner sidewall along a circumferential arcuate length intermediate the tread and bead portion thereof.

2. In a spreader device for tire casings having a pair of axially spaced mounting members supported for relative movement therebetween longitudinally along a common axis, a plurality of circumferentially spaced spreader arms extending generally axially of and pivotally mounted to each of said mounting members with the free end portions thereof generally radially movable relative to said common axis, the improvement comprising, in combination with the free end portion of each spreader arm, of attachment means for engaging a tire casing sidewall along a circumferential arcuate length intermediate the tread and bead portions thereof, said attachment means including a head carried by each of said free end portions and extending radially outwardly therefrom, each of said heads having a laterally offset circumferentially arcuate elongated tire casing sidewall engaging shoe disposed in radially outwardly spaced relation to the respective free end portion and defining therewith a recess for receiving a tire bead therewithin during the spreading operation, the free end portion of each spreader arm defining a stop means for engaging a tire bead to limit the radially outwardly pivotal movement thereof and to position the respective head within a tire casing with its shoe in engagement with the tire casing sidewall along said circumferential arcuate length and radially outwardly spaced from the beads thereof.

3. In a spreader device for tire casings having a pair of axially spaced mounting members supported for relative movement therebetween longitudinally along a common axis, a plurality of circumferentially spaced spreader arms extending generally axially of and pivotally mounted to each of said mounting members with the free end portions thereof generally radially movable relative to said common axis and a generally radially outwardly projecting spreader bracket of relatively short circumferential dimension carried by the free end portion of each of said spreader arms, the improvement comprising, in combination with each of said spreader brackets, of attachment means for enabling the spreader device to forcefully engage a tire casing inner sidewall throughout a substantial circumferential extent outwardly of the beads thereof in order to prevent injury to a tire bead during the spreading operation thereof, said attachment means comprising a supplemental head carried by each of said spreader brackets, each of said supplemental heads having a generally radially outwardly extending socket portion dimension to be slidably received by the respective spreader bracket, means for removably securing each socket portion to the respective spreader bracket, and a circumferentially arcuate elongated tire casing inner sidewall engaging shoe secured to each socket portion and projecting axially and generally equi-distantly laterally on opposite sides therefrom in radially outwardly spaced relation to the free end portion of the respective spreader arm and defining therewith a recess for receiving a tire bead therewithin during the spreading operation, the free end portion of each spreader arm defining a stop means for initially engaging a tire bead to support and limit the radially outwardly pivotal movement thereof and to position the respective shoe in engagement with a tire casing sidewall along a circumferential arcuate length intermediate the tread and bead portions thereof.

References Cited in the file of this patent

UNITED STATES PATENTS

| | | |
|---|---|---|
| 1,908,311 | Branick | May 9, 1933 |
| 2,043,169 | Hawkinson | June 2, 1936 |
| 2,347,311 | Branick | Apr. 25, 1944 |
| 2,353,570 | Kraft | July 11, 1944 |
| 2,665,883 | Glynn | Jan. 12, 1954 |